Dec. 16, 1924.
C. KENT
TRACTOR STEERING DEVICE
Filed April 21, 1923
1,519,494
2 Sheets-Sheet 2
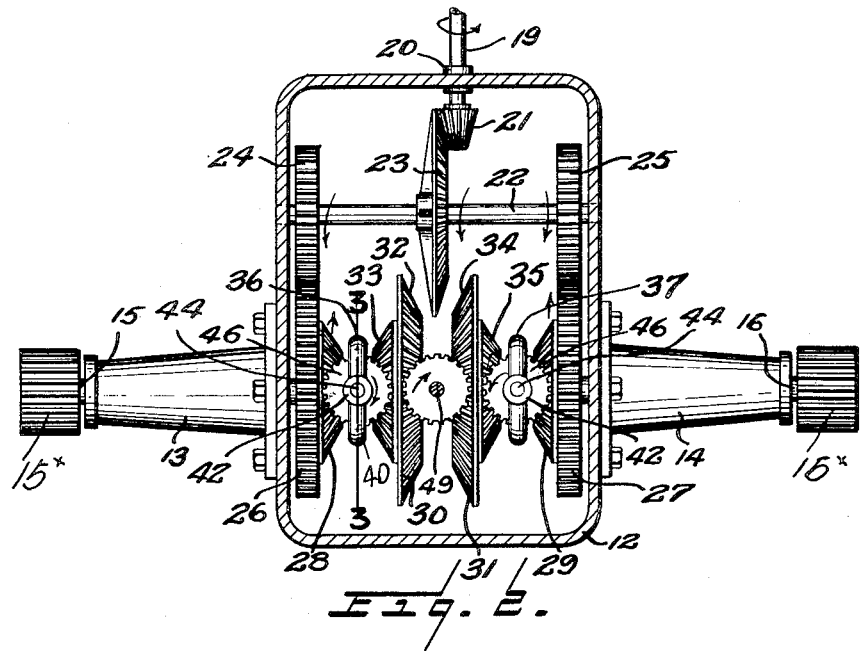
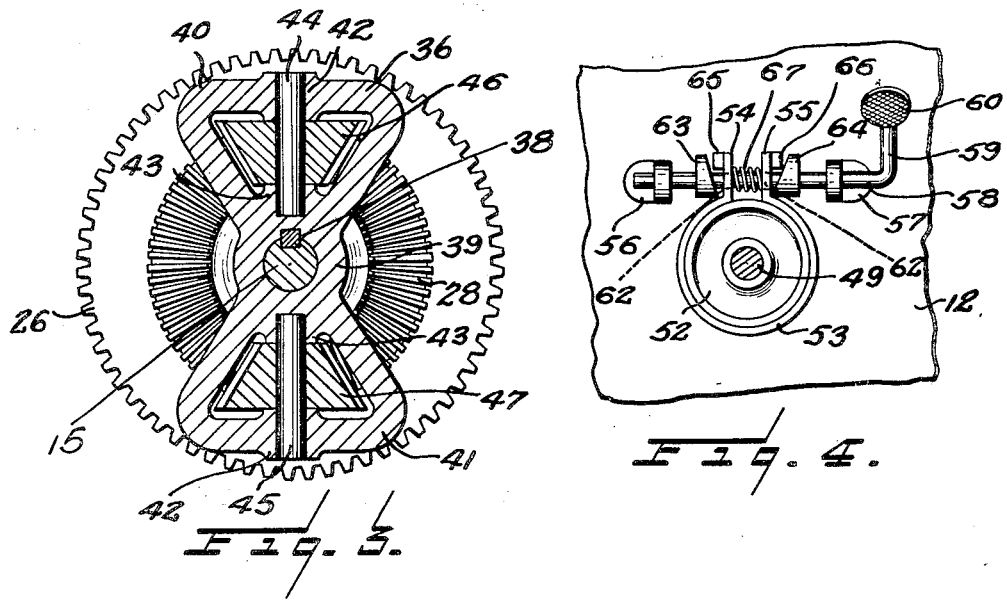
Inventor,
Charles Kent.
By Fetherstonhaugh & Co.
Attys.

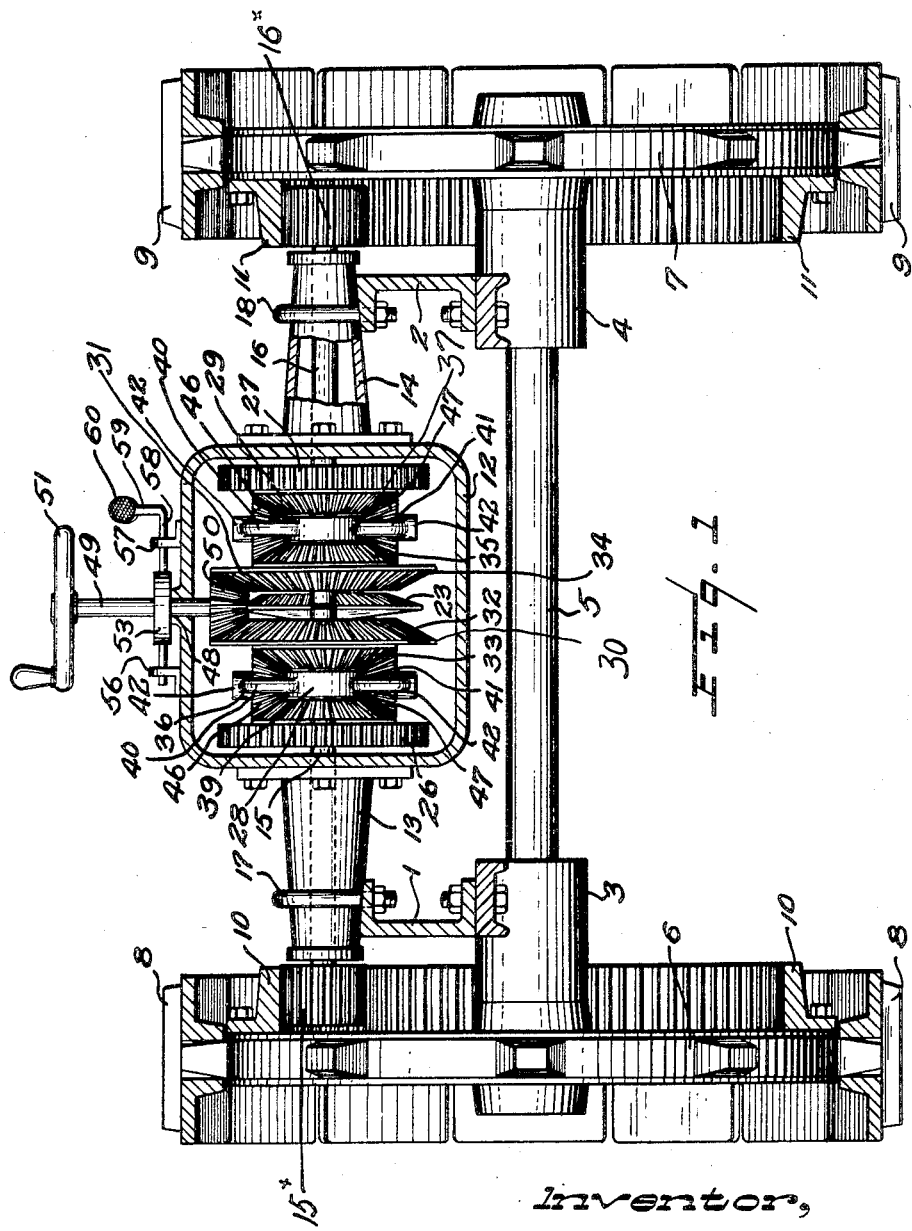

Patented Dec. 16, 1924.

1,519,494

UNITED STATES PATENT OFFICE.

CHARLES KENT, OF SUNDRIDGE, ONTARIO, CANADA.

TRACTOR STEERING DEVICE.

Application filed April 21, 1923. Serial No. 633,680.

*To all whom it may concern:*

Be it known that I, CHARLES KENT, a subject of the King of Great Britain, and a resident of the village of Sundridge, in the district of Parry Sound, in the Province of Ontario, Canada, have invented certain new and useful Improvements in Tractor Steering Devices, of which the following is the specification.

My invention relates to improvements in tractor steering devices and the object of the invention is first, to devise in a tractor means by which such tractor is always driven in a positively straight course both while going forward or backing up; second, in which there is always a constant and positive driving connection between the driving shaft and tractor wheels so that there will be no slippage of the driving connection to the tractor tread at one side of the tractor in relation to the tractor tread on the opposite side and thereby eliminating the attendant dangers consequent thereto; third, in which the driving mechanism may be readily controlled to produce an even and quick turn to the tractor and fourth, in which means are provided for equalizing the drive when passing over rough ground or obstructions as hereinafter more particularly explained by the following specification.

Fig. 1 is a cross sectional view through a tractor showing the tractor tread, the bevel gears, frame and axle and my mechanism applied thereto.

Fig. 2 is a sectional plan view through the gear casing and my driving mechanism.

Fig. 3 is an enlarged sectional view on line 3—3, Fig. 2.

Fig. 4 is a sectional plan detail of my locking mechanism.

In the drawings like characters of reference indicate corresponding parts in each figure.

1 and 2 indicate the longitudinal members of a tractor frame on which are carried bearing sleeves 3 and 4 so as to depend beneath the frame. 5 is the axle journalled in the bearings 3 and 4 on which are mounted the bull gears 6 and 7 carrying traction treads 8 and 9 in the usual way. 10 and 11 are internal gear rings carried by the bull gears 6 and 7. 12 is a gear casing from which extend laterally hollow arms 13 and 14 forming housings for shafts 15 and 16, such shafts being in central longitudinal alignment, the inner ends being adjacent one to the other centrally of the tractor and having secured to their outer ends gear pinions 15$^x$ and 16$^x$ meshing with the gear wheels 10 and 11. The housings 13 and 14 are secured to the longitudinals 1 and 2 of the tractor frame by means of U bolts 17 and 18 which clamp these housings to the frame. 19 is the driving shaft of the tractor driven by the engine of the tractor in the usual way.

The shaft 19 is journalled as indicated at 20 in the wall of the casing 12 so as to project inwardly thereof. 21 is a bevel gear pinion secured to the inwardly projecting end of the shaft 19. 22 is a cross shaft journalled in the side walls of the casing 12. 23 is a bevel gear secured to the shaft 22 in mesh with the pinion 21. 24 and 25 are gear wheels secured to the shaft 22 in proximity to each end thereof within the casing 12. 26 and 27 are gear wheels freely mounted upon the shafts 15 and 16 so as to mesh with the gear wheels 24 and 25. 28 and 29 are bevel gears formed integral with the gear wheels 26 and 27, such bevel gears extending inwardly from the inner faces of each gear wheel 26 and 27 so as to oppose one another. 30 and 31 are gear members also mounted freely upon the shafts 15 and 16, the gear member 30 comprising a relatively large inner bevel gear 32 and a small outer bevel gear 33. The gear member 31 comprises an inner large bevel gear 34 and an outer small bevel gear 35, the bevel gears 32 and 34 being of equal diameter and the bevel gears 33 and 35 also being of equal diameter.

The gear members 30 and 31 are spaced apart from each other and from the bevel gears 28 and 29. 36 and 37 are pinion frames secured to the shafts 15 and 16 as indicated at 38 in Fig. 3. Each pinion frame 36 and 37 comprises a central hub portion 39 from which extend diametrically open wing portions 40 and 41 substantially triangular in form, the apex portion of each triangle extending inward so as to merge into the hub portion 39. The open triangular wing portions 40 and 41 are provided with aligned bearings 42 and 43, the bearings 43 being on diametrically opposite sides of the hub portion 39. 44 and 45 are short shafts journalled in the bearings 42 and 43 and on which are mounted within the open wing portions 40 and 41 bevel pinions 46 and 47. The pinions 46 and 47 of the pinion frame 36 are in constant mesh with the bevel gears 28 and 33. The pinions 46 and 47 of the pinion frame 37 are in constant mesh with the bevel gears 29 and 35. 48 is a bearing formed in the upper wall of the casing 12 and located centrally between the gear members 30 and 31. 49 is a steering shaft journalled in the bearing 48. 50 is a bevel pinion secured to the lower end of the shaft 49 and meshing with the bevel gears 32 and 34 of the gear members 30 and 31.

51 is a hand wheel by which the shaft 49 is controlled. 52 is an inner brake member secured to the shaft 49 around which extends a brake band 53. The ends of the band 53 are turned outward so as to oppose each other as indicated at 54 and 55. 56 and 57 are brackets secured to the top of the casing 12 in which is journalled a rocking rod 58 provided at one end with a crank portion 59 carrying a foot pedal 60. The rod 58 extends through orifices 61 and 62 formed in the out-turned ends 54 and 55 of the brake band 53. 63 and 64 are face cams secured to the rod 58 against which the friction blocks 65 and 66 carried by the out-turned ends 54 and 55 of the brake band coact. 67 is a compression spring surrounding the rod 58 between the out-turned portions 54 and 55 tending to hold such portions apart.

Having described the principal parts involved in my invention I will briefly describe the operation of the same.

Normally the shaft 49, bevel gear 50 and hand wheel 51 are stationary and the driving shaft 19 rotated in the direction of arrow (see Fig. 2).

By this means the pinion 21 is revolved rotating the gear wheel 23, shaft 22 and gears 24 and 25 also in the direction of arrow.

By this means the gears 26 and 27 are revolved in the direction indicated in Fig. 2, such gears rotating freely upon the shafts 15 and 16. As before stated the gear pinions 46 and 47 of the pinion frames 36 and 37 are interposed between the gears 28 and 33 on one side of the gear case 12 and between the gears 29 and 35 on the opposite side of the gear case 12.

Also, as before stated, the gear 50 is in a stationary position meshing with the gears 32 and 34 holding them stationary and consequently holding the gears 33 and 35 stationary, the pinion frames 36 and 37 being keyed or otherwise secured to the shafts 15 and 16. When the gears 28 and 29 are revolved they rotate such pinions so that they travel around the stationary gears 33 and 35 thereby driving the shafts 15 and 16, the pinions 46 and 47 travelling around the gears 33 and 35.

Normally the gear members 30 and 31 will remain in a stationary position during the aforesaid driving operation, that is, when the tractor is travelling over a level road. If, however, the tractor should strike against an obstruction or pass over rough ground it may be necessary to lock the shaft 49 so that it will not rotate. The operator, in order to do this, compresses the foot pedal 60 downward so as to force the cam surfaces of the cams 63 and 64 so as to force the friction blocks 65 and 66 downward against the outward pressure of the spring 67 and thereby force the band 53 into engagement with the brake member 52.

By this means the shaft 49 is positively held stationary. When it is desired to drive the tractor around a curve the shaft 49 is freed and the hand wheel 51 rotated in the direction of the turn so as to rotate the gear members 30 and 31 in opposite directions whereby the drive between the pinions 46 and 47 and gear member 30 or 31 at one side of the gear case 12 is speeded up and the drive between the corresponding pinions at the opposite side of the gear case 12 and the gear member 30 or 31 with which it is in mesh is retarded. In other words, during this operation, as will be more clearly seen on referring to Fig. 2, the gear pinion 46 as it travels around the gear 33 during its normal drive has its driving connection to the shaft 15 retarded by the gear 33 rotating in the same direction as the pinion 46, whereas, on the opposite side the driving connection is accelerated by the gear 35 travelling in the opposite direction of travel to the pinion 46 thereby rendering the speed of the drive at each side unequal so that one tractor tread is driven at high speed and the other at comparatively low speed causing the tractor to follow the curve of the road, such curve being sharp or gradual according to the speed at which the hand wheel 51 is rotated.

From this description it will be seen that I have devised a very simple construction of tractor steering device by which the tractor drive may be always under positive control, the driving connection between the drive shaft and the tractor tread never being broken when changing from driving direct forward to direct rearward or to driving around a curve and in which whether driving forward or rearward a direct course may always be maintained.

What I claim as my invention is:

1. In a tractor provided with tractor tread belts, the combination with a divided drive shaft and a driving connection between the outer end of each member of the drive shaft and the corresponding tractor tread belt, of a bevelled gear mounted on each member of the drive shaft, a driving connection between the engine shaft and each of the aforesaid bevelled gears, an independently operated steering shaft, a foot pedal operated band brake for locking the steering shaft at will in a stationary position, and a bevelled gear carried by the lower end of the steering shaft and meshing with the bevelled gears carried by the divided members of the drive shaft.

2. In a tractor provided with tractor tread belts the combination with the driving gears of such treads and the engine drive shaft, of a driving shaft and pinion for each tread, a bevel gear freely mounted on each drive shaft, a gear opposing each of the aforesaid gears and also freely mounted, a pinion carried by each drive shaft to rotate therewith and revoluble on an axis radial to its corresponding drive shaft and meshing with the aforesaid gears at diametrically opposite points, a driving connection between the engine drive shaft and the opposing gears, an independently operated steering shaft, and means operated thereby for turning the first mentioned freely mounted gears in opposite directions.

3. In a tractor provided with tractor tread belts, the combination with the driving gears of such treads and the engine drive shaft, of a driving shaft and pinion for each tread, a bevel gear freely mounted on each tractor tread drive shaft, a gear opposing each of the aforesaid gears and also freely mounted, a pinion carried by each tractor tread drive shaft to rotate therewith and revoluble on an axis radial to its corresponding tractor tread drive shaft and meshing with the aforesaid gears at diametrically opposite points, a driving connection between the engine drive shaft and the opposing gears, an independently operated steering shaft, inwardly presented opposing bevel gears formed integral with the second mentioned freely mounted bevel gears, and a bevel pinion secured to the steering shaft and interposed between the inwardly presented gears so as to mesh simultaneously therewith.

4. In a tractor provided with tractor tread belts, the combination with the driving gears of such treads and the engine drive shaft, of a driving shaft and pinion for each tread, a supplemental shaft mounted on suitable bearings and provided with a gear at each end, a gear intermeshing therewith and freely mounted on each tractor tread drive shaft, a driving connection between the supplemental shaft and the engine shaft, a bevel gear formed integral with each freely mounted gear, a freely mounted opposing gear also carried by each tractor tread drive shaft, a pinion frame keyed to each drive shaft between each freely mounted gear and its opposing freely mounted gear, a pinion journalled in a radial axis in each pinion frame and meshing at diametrically opposite points with one of the freely mounted gears and an opposing freely mounted gear, a steering shaft, and means operated by the steering shaft for holding the opposing gears in a stationary position or for rotating them in opposite directions.

5. In a tractor provided with tractor tread belts, the combination with the driving gears of such treads and the engine drive shaft, of a driving shaft and pinion for each tread, a supplemental shaft mounted on suitable bearings and provided with a gear at each end, a gear intermeshing therewith and freely mounted on each tractor tread drive shaft, a driving connection between the supplemental shaft and the engine shaft, a bevel gear formed integral with each freely mounted gear, a freely mounted opposing gear also carried by each tractor tread drive shaft, a pinion frame keyed to each tractor tread drive shaft between each freely mounted gear and its opposing freely mounted gear, a pinion journalled in a radial axis in each pinion frame and meshing at diametrically opposing points with one of the freely mounted gears and an opposing freely mounted gear, a steering shaft, a foot pedal operated brake band for locking the steering shaft at will in a stationary position, a bevel gear carried by the lower end of the steering shaft, and bevel gears meshing with such gear at diametrically opposite points and formed integral with the opposing freely mounted gears carried by the tractor tread drive shafts.

CHARLES KENT.